United States Patent
Wolfe

(10) Patent No.: US 9,724,772 B2
(45) Date of Patent: Aug. 8, 2017

(54) VIBRATING CHAIN SAW SHARPENER

(71) Applicant: VERA TEC, INC., Charleston, WV (US)

(72) Inventor: Bobby Wolfe, Charleston, WV (US)

(73) Assignee: VERA TEC, INC., Charlston, WV (US)

( * ) Notice: Subject to any disclaimer, the term of this patent is extended or adjusted under 35 U.S.C. 154(b) by 178 days.

(21) Appl. No.: 13/768,647

(22) Filed: Feb. 15, 2013

(65) Prior Publication Data

US 2014/0230607 A1 Aug. 21, 2014

(51) Int. Cl.
*B23D 63/16* (2006.01)

(52) U.S. Cl.
CPC .................................. *B23D 63/166* (2013.01)

(58) Field of Classification Search
CPC .. B23D 63/162; B23D 63/168; B23D 63/166; B23D 63/16; B24B 3/14; B24B 3/265; B26D 15/06; B26D 7/12
USPC ............. 451/548, 542, 45, 349, 541, 6, 359; 83/174; 76/81–81.8, 82–89.2; 30/138–139
See application file for complete search history.

(56) References Cited

U.S. PATENT DOCUMENTS

| | | | | |
|---|---|---|---|---|
| 332,187 A | * | 12/1885 | ComstogK | 451/549 |
| 1,491,079 A | * | 4/1924 | Champion | 451/41 |
| 1,561,231 A | * | 11/1925 | Hatz | B23D 63/005 76/37 |
| 1,801,802 A | * | 4/1931 | Conyngham | 451/278 |
| 1,918,575 A | * | 7/1933 | Van Berkel | B24B 3/463 451/262 |
| 1,942,016 A | * | 1/1934 | Andrus | B23D 63/14 76/24.1 |
| 2,439,279 A | * | 4/1948 | Andrus | 76/37 |
| 2,651,336 A | * | 9/1953 | Warren | 83/833 |
| 2,729,988 A | * | 1/1956 | Beach | B23D 63/005 76/77 |
| 2,821,097 A | * | 1/1958 | Carlton | 76/37 |
| 2,993,312 A | * | 7/1961 | Holland et al. | 451/549 |
| 3,122,865 A | * | 3/1964 | Kolling | B24B 3/365 451/349 |
| 3,596,414 A | * | 8/1971 | Pirrello | 451/359 |
| 4,254,673 A | * | 3/1981 | Simington | 76/80.5 |
| 4,416,169 A | | 11/1983 | Silvey | |
| 4,442,637 A | * | 4/1984 | Ahejew | B24B 3/045 451/48 |
| 4,611,438 A | * | 9/1986 | Siden | B24D 5/00 451/461 |

(Continued)

FOREIGN PATENT DOCUMENTS

JP H10128619 A * 5/1998 ............. B23D 63/16

*Primary Examiner* — Joseph J Hail
*Assistant Examiner* — Arman Milanian
(74) *Attorney, Agent, or Firm* — Arent Fox LLP

(57) ABSTRACT

A vibrating chain saw sharpener for sharpening a saw chain that includes a cylindrical body portion; a ring portion connected to and encompassing an intermediate portion of the cylindrical body portion; a flange portion extending away from a bottom portion of the cylindrical body portion; and a hand-held power tool removably connected to an upper portion of the cylindrical body portion. Vibrations transmitted from the hand-held power tool to the ring portion are conveyed to the tooth of the chain saw, wherein the tooth is sharpened by the vibrations conveyed thereto.

18 Claims, 12 Drawing Sheets

(56) References Cited

U.S. PATENT DOCUMENTS

| | | | | |
|---|---|---|---|---|
| 4,776,402 A | * | 10/1988 | Meikle | A01L 11/00 144/118 |
| 4,836,058 A | * | 6/1989 | Shepherd | B23D 63/164 76/40 |
| 5,156,071 A | | 10/1992 | Stevens | |
| 5,241,791 A | * | 9/1993 | Lacy | 451/195 |
| 5,371,977 A | * | 12/1994 | Liner | B24B 3/365 451/262 |
| 5,733,074 A | * | 3/1998 | Stock | B23B 37/00 408/129 |
| 6,079,295 A | | 6/2000 | Beard, Jr. | |
| 6,257,967 B1 | * | 7/2001 | Schultz | 451/349 |
| 7,900,536 B2 | | 3/2011 | Hensley et al. | |
| 2007/0054604 A1 | * | 3/2007 | Scott | B24D 15/06 451/45 |
| 2007/0167121 A1 | * | 7/2007 | Cendak | B23D 63/166 451/419 |
| 2009/0071297 A1 | | 3/2009 | Irwin | |
| 2011/0120268 A1 | * | 5/2011 | Sasanuma et al. | 76/80.5 |

* cited by examiner

VIBRATING CHAIN SAW SHARPENER

BACKGROUND OF THE INVENTION

1. Field of the Invention

The present invention relates generally to a portable chain saw sharpener in which the sharpener is adapted to file or sharpen the cutting teeth of a chain saw as well as the depth gauge members of the chain saw. In particular, the present invention is directed to a chain saw sharpener, in which the cutting surfaces of the teeth of a saw chain are conveniently sharpened quickly without removing the chain from the chain bar.

2. Description of the Prior Art

Chain saws are normally employed in logging operations for the harvesting of timber. The cutting chain of a chain saw is constructed from riveted metal sections and features sharp cutting teeth. The cutting teeth of the chain saw have two cutting surfaces: one perpendicular to the saw kerf and the other parallel to the saw kerf.

The cutting chain of the chain saw also features a depth gauge or "raker" that rides ahead of each cutting tooth. The height of the rakers in relationship to the cutting teeth controls the depth of the cut made by the cutting teeth. For example, if the raker is too high, the tooth will not cut and if the raker is too low, the tooth will cut too deeply. Therefore, maintaining the height of the rakers is important for proper functioning of a chain saw.

Maintaining the sharpness of a chain saw is particularly important for maintaining cutting efficiency and for preventing injuries caused by snagging of the chain as a result of dull cutting teeth. It is well known that a saw chain can become dull quite quickly when the chain saw is used for moderate to heavy jobs, and it is not uncommon for the chain in heavy use to require sharpening twice in one day. Therefore, a method and apparatus for sharpening a saw chain quickly and conveniently is important to minimize down time on any particular job. It is preferable that the saw chain be sharpened without removing the chain from the saw, in order to reduce the time and trouble necessary to sharpen the chain. In addition, it is desirable for the sharpener to be easily portable, so that the sharpener can be brought along to remote jobs where a chain saw is often used.

Large industrial sized machines are available for sharpening saw chains, but these devices require removing the chain from the saw and leaving the chain for sharpening by an experienced professional and waiting for a later pick-up. It is obvious that this method is time consuming and inconvenient, and requires the intensive chain saw user to keep a number of extra chains on hand so that in the field a sharp chain is readily available to replace a dull chain. Another disadvantage of machine sharpening is that it eats away the cutting blade of the chain saw every time the saw is sharpened. Usually, after machine sharpening the chain saw for 3 to 4 times, no functional blade is left.

A number of devices exist for sharpening the teeth of chain saws. For example, U.S. Pat. No. 4,416,169, "Automatic Saw Chain Grinder" to Silvey discloses a chain saw grinder which uses a grinding wheel rotated by a motor to grind the teeth of the chain saw. The chain saw advances over pulley wheels so that each tooth can be sharpened. A disadvantage of this type of sharpener is that the grinding wheel of the sharpener and cutting teeth of the chain both eventually become worn away. Moreover, the sharpener is not portable and the chain needs to be removed from the saw.

U.S. Pat. No. 5,156,071, "Chain Saw Sharpener with Built-up Grinding Tool" to Stevens discloses a chain saw sharpener that includes a sharpening tool constructed of a flat metal disc and an abrasive bead bonded along one side of the peripheral edge of the flat metal disc. The sharpening tool is supported between two support discs and is attached to the shaft of a motor for rotation about its axis. The chain saw sharpener of Stevens further employs a chain holder to clamp a chain saw chain to a semi-circular shaped holder during sharpening. The chain saw sharpener disclosed in Stevens is not easily portable and requires that the chain be removed from the saw in order to be sharpened.

Another type of chain saw sharpener is disclosed in U.S. Pat. No. 6,079,295, "Chain Saw Blade Sharpener with Stop" to Beard, Jr., in which the sharpening device includes a file mounting assembly, a clamping assembly, a chain stop and a circular file slidably coupled to the file mounting assembly. This type of sharpening device is helpful in maintaining the chain saw chain in place while sharpening. However, with this type of sharpener, the chain needs to be advanced manually and the file used for sharpening wears down more quickly.

U.S. Patent Application Publication No. 2009/0071297A1, "Chain saw Sharpening Tool" to Irwin discloses a chain saw sharpening tool that includes a barrel-shaped file guide and holder rigidly secured to one end of a round file and the opposite end of the file is connected to a power tool. Although this sharpening tool sharpens the cutting teeth of a chain saw, a separate file is required to adjust the height of the rakers after the sharpening of the cutting teeth.

Applicant's own U.S. Pat. No. 7,900,536, "Chain Saw Sharpener with Composite Wiskar" to Hensley, discloses a saw chain sharpener for a chain saw in which the bottom surfaces of the cutting teeth of a bottom sharpened chain saw are automatically sharpened by running the chain through the sharpener. The sharpener includes a sharpening device disposed in a recess of a housing attached removably to a chain saw and a lifting device for lifting the cutting teeth to a sharpening position. The sharpening device includes a sharpening wiskar, wherein the top surface of the sharpening wiskar is positioned to frictionally engage the bottom surface of the teeth to bottom sharpen the cutting teeth when the chain saw is operated.

The chain saw sharpeners described above have drawbacks such as they may not be easily portable, require a separate mounting and/or clamping assembly, require a separate file to adjust the height of the rakers, etc. Further, the known devices may require additional safety measures like a shield or a table vise to operate, wherein the present invention does not require such additional safety precautions to operate safely and reliably.

SUMMARY OF THE INVENTION

In accordance with the present invention, a chain saw sharpener for a chain saw includes a sharpening device removably connected to a hand-held power tool. The sharpening device includes a cylindrical body portion, a ring portion connected to the cylindrical body portion, and a radially extending flange portion at the bottom of the cylindrical body portion.

The cylindrical body portion is a multi-part portion designed to connect a hand-held power tool to the ring portion and the flange portion and to transmit vibrations from the hand-held power tool to the ring portion and the flange portion. In one embodiment, the cylindrical body portion includes an upper portion to which a hand-held power tool is removably attached to, an intermediate portion connected to and encompassed by the ring portion, and a bottom portion from which the flange portion extends away. In one embodiment, the upper portion, the intermediate portion and the bottom portion of the cylindrical body are removably connected to each other. In another embodiment, the upper portion, the intermediate portion, the ring portion, the bottom portion and the flange portion are all removably connected to the sharpening device. This would allow the user to replace the ring portion and/or a flange portion with another ring portion or flange portion of a different size or shape. The different parts of the sharpening device are removably connected using one or more techniques known in the art. For example, in an embodiment, the upper portion, the intermediate portion, the ring portion, the bottom portion and the flange portion may be removably connected to the neighboring portion using a washer and a screw. Although it is preferable that the cylindrical body portion has a cylindrical configuration, it is also within the scope of the invention for the cylindrical body portion to have other suitable configurations including, but not limited to, rectangular, square, and polygonal.

The ring portion of the sharpening device includes a ring and a plate-like body portion and is connected to the cylindrical body portion via the plate-like body portion. It is the ring portion of the sharpening device that engages a cutting tooth of a chain saw and sharpens it when the ring portion is vibrated using the power tool. Although it is preferable that the ring portion has a circular shape, it is also within the scope of invention for the ring portion to have other geometrical configurations including, but not limited to, oval, oblong, square, triangular, rectangular, trapezoidal etc. In an embodiment, the ring portion may not be completely closed and there may be one or more openings in the periphery of the ring portion. The plate-like body portion may span half, more than half or less than half of the area defined by the ring portion. In one embodiment, the plate-like body portion spans more than half but not the entire area defined by the ring portion. The plate-like body portion and the circular ring define an aperture or opening through which an operator may view the engagement of the sharpener with a cutting tooth while the tooth is being sharpened. In one embodiment, the plate-like body portion and the circular ring define two apertures. In this embodiment, the plate-like body portion lies approximately in the middle of the ring portion.

The bottom of the cylindrical body portion includes the radially extending flange portion. The flange portion of the sharpening device provides a proper angle for the ring portion to engage or fit into the cutting teeth of a chain saw so as to sharpen the cutting teeth of the chain saw. According to one embodiment of the invention, the size of the flange portion varies depending on the cutting angle of a chain saw tooth. By size it is meant the overall configuration of the flange portion including the height, width and the diameter of the flange portion. The flange portion of the sharpening device files or sharpens the rakers that ride ahead of the cutting teeth of the chain saw in order to maintain the height of the rakers in relationship to the cutting teeth.

The ring portion and the flange portion of the sharpening device may be coated with an abrasive material. In one embodiment of the invention, only the part of the ring portion that engages the cutting tooth of a chain saw may be coated with an abrasive material.

In one embodiment of the invention, at least one of the ring portion and the flange portion extends orthogonally relative to a longitudinal axis of the cylindrical body portion. In another embodiment of the invention, at least one of the ring portion and the flange portion extends obliquely relative to a longitudinal axis of the cylindrical body portion.

During operation of the sharpener, the ring portion is inserted into or under the cutting tooth of a chain saw which is sharpened when the sharpening device is vibrated by the power transmitted from the hand-held power tool attached thereto. A chain saw may be sharpened by sonic, ultrasonic or other forms of vibrations transmitted from the hand-held power tool via the sharpening device. As the tooth of a chain saw is sharpened, its height is lowered in relation to the corresponding raker. Therefore, the rakers also need to be filed or sharpened to maintain proper positioning with respect to the cutting teeth. The flange portion of the sharpening device files or sharpens the rakers to a desired dimension when the sharpening device is vibrated by the hand-held power tool. By "filing the raker to a desired dimension," it is meant that the height, width, and depth, as well as the overall shape of the raker is adjusted using the flange portion.

The chain saw sharpener of the present invention provides a number of advantages over known devices. The sharpener is designed to sharpen the teeth of a saw chain without removing the saw chain from the chain bar. The sharpener of the present invention extends the life of a chain saw chain since the sharpener sharpens the cutting surfaces of the teeth to preferred or predetermined dimensions without over-sharpening the blade of the teeth. Moreover, the present invention eliminates the need of a separate file for filing the rakers to a desired dimension since the flange portion of the present device sharpens or files the rakers to appropriate dimensions. The sharpener of the invention quickly sharpens the chain saw. Because the sharpening device of the present invention fits snugly against the cutting teeth of the chain saw, it eliminates the need of a separate mounting assembly for proper positioning of a sharpening file or device. Another advantage of the chain saw sharpener of the present invention is that the left and right cutting teeth of a chain saw can be sharpened without changing the orientation of the chain saw or without requiring the operator to move to a different position.

According to the present invention, the cutting teeth of a chain saw are sharpened by inserting the ring portion of the sharpener under the cutting edge of a tooth. In one aspect of the invention, a part of the ring portion engages the cutting tooth of a chain saw and the sharpener is vibrated by the hand-held power tool so as to sharpen the cutting tooth via the vibrations. To sharpen the rakers to desired dimensions, a raker gauge tool is placed on the saw chain, the sharpener is vibrated by turning on the hand-held power tool, and the flange portion of the sharpener is used to sharpen the rakers to desired dimensions.

According to the present invention, the flange portion and the ring portion of the sharpening device are configured so that the flange portion provides a proper angle for the ring portion to engage a cutting tooth of a chain saw. In one aspect of the invention, the flange portion and the ring portion of the sharpening device are configured so that the flange portion secures the ring portion onto the chain saw to provide a desired cutting angle when the ring portion is inserted into or under, i.e., engages, the cutting tooth. According to one embodiment of the invention, the size of the flange portion varies depending on the cutting angle of a chain saw tooth. For example, in an embodiment, the size of the flange portion employed to sharpen a tooth with a cutting angle of 30° will be greater than the size of the flange portion employed to sharpen a tooth with a cutting angle of 35° and smaller than the size of the flange portion employed to sharpen a cutting angle of 10°. Similarly, the size of the flange portion employed to sharpen a tooth with a cutting angle of 10° will be greater than the size of the flange portions employed to sharpen chain saw teeth with cutting angles of 30° or 35°. In another embodiment of the invention, the size of the flange portion employed to sharpen a tooth with a cutting angle of 30° will be smaller than the size of the flange portion employed to sharpen a tooth with a cutting angle of 35°. In a preferred embodiment, the flange portion is removably connected to the sharpening device allowing a user to change the flange portion depending on the cutting angle of a chain saw to be sharpened. In an alternative embodiment, the flange portion may comprise one or more sections of different configuration where each section can engage the ring portion of the sharpening device onto a chain saw of a different cutting angle. That is, in this embodiment, the same flange portion could be used for engaging chain saw teeth of different cutting angles into the ring portion and a user does not have to change the flange portion for sharpening chain saws of different cutting angles.

In one embodiment of the invention, the outer diameter of the ring portion is greater than the outer diameter of the flange portion. In another embodiment of the invention, the outer diameter of the flange portion is greater than the outer diameter of the ring portion.

The ring portion of the sharpening device is configured to engage the cutting teeth of chain saw chains of various or different sizes. The term "size" of a chain saw chain as used herein means the pitch and gauge of the chain saw chain. Thus, the ring portion of the sharpening device is configured to engage or fit snugly against cutting teeth on chain saws with different pitch and gauge measurements. It is preferable that the ring of the ring portion preferably has a circular cross-section. However, it is also within the scope of the invention that the cross-section of the ring has other geometrical configurations including, but not limited to, oval, oblong, or any other suitable configuration such that the ring portion can conveniently engage a cutting tooth of a chain saw. In one embodiment, the cross-sectional diameter of a portion of the ring could be different from the cross-sectional diameter of another portion of the ring.

The sharpening device of the present invention may be made of steel, aluminum, or any material that is hard enough to properly sharpen the cutting teeth of a saw chain. The ring portion of the sharpening device that sharpens the cutting teeth of a chain saw and the rakers present between the cutting teeth may be knurled and/or coated with a suitable abrasive material. For example, a suitable abrasive material could be a natural material such as calcium carbonate or sand or a synthetically produced material such as ceramic, stainless steel abrasive etc. In one embodiment, the ring portion and/or the flange portion are coated with a Teflon coating. In another embodiment, the surface of the circular ring is coated with an abrasive material of varying grit size. For example, a portion of the circular ring may comprise an abrasive of 400 grit size, the second portion may comprise an abrasive of 300 grit size, the third portion may comprise an abrasive of 200 grit size and so on. In an embodiment, a portion of the circular ring may be smooth and may not comprise any abrasive material. The ring of the ring portion may be made of porcelain, steel, ceramic, a soft metal that is coated with a diamond dust, a moderately hard material or any other material that provides a suitable sharpening surface.

The hand-held power tool removably attached to the cylindrical portion of the sharpening device can be powered by a battery or by any other known or later-developed power source. Instead of a hand-held power tool, the sharpening device could simply be put onto a rotary drill that would rotate the sharpening device for sharpening purposes. Alternatively, the sharpening device could be operated manually as a hand-driven file.

The invention also includes a method for sharpening the cutting teeth of a saw chain disposed on a chain bar of a chain saw without removing the chain from the bar. The method includes the steps of vibrating a sharpener with a hand-held power tool; inserting the ring portion of the sharpener under a first cutting tooth of the saw chain; sharpening the first cutting tooth of the saw chain; lifting the sharpener from the first cutting tooth; inserting the ring portion of the sharpener under the next cutting tooth of the saw chain; and repeating the above steps until all cutting teeth of the saw chain are sharpened.

The invention further includes a method for filing the rakers present between the cutting teeth of a saw chain. The method for filing the rakers includes the steps of measuring the height of a raker by placing a raker gauge on the saw chain and filing the raker to desired dimensions using the flange portion of the sharpener vibrated by the hand-held power tool.

A method for sharpening a chain saw according to the invention includes a method for sharpening the cutting teeth of the chain saw and a method for sharpening the rakers present between the cutting teeth of the chain saw.

BRIEF DESCRIPTION OF THE DRAWINGS

The invention will now be described with reference to the drawings wherein.

DETAILED DESCRIPTION OF THE PREFERRED EMBODIMENT

Figure 1:
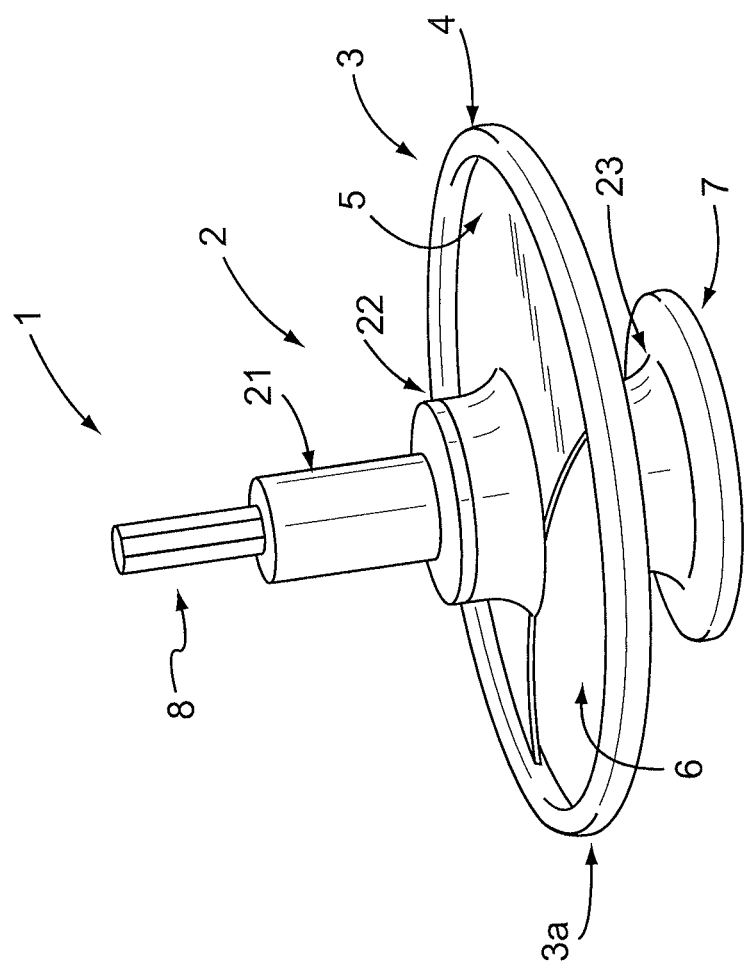
FIG. 1 is a perspective view of a chain saw sharpener according to the invention.

A chain saw sharpener according to the present invention is shown in FIG. 1. The sharpening device (1) includes a cylindrical body portion (2), a ring portion (3) and a radially extending flange portion (7). The cylindrical body portion (2) is a multi-part (21, 22, and 23) portion designed to connect to a hand-held power tool, the ring portion (3), and the flange portion (7). The cylindrical body portion (2) transmits vibrations from the hand-held power tool to the ring portion (3) and the flange portion (7).

The ring portion (3) of the sharpening device (1) includes a circular ring (4) and a plate-like body portion (5) and is connected to the cylindrical body portion (2) via the plate-like body portion (5). The plate-like body portion (5) is shown as spanning more than half of the area defined by the circular ring (4). However, the plate-like body portion (5) could be configured to span half or less than half of the area defined by the circular ring (4). The circular ring (4) and the plate-like body portion (5) define an opening (6) where the ring portion (3) does not have the plate-like body portion (5). An operator can see the position of the sharpening device with respect to a cutting tooth through the opening (6). It is within the scope of the invention for the opening (6) to include a transparent material that covers a part of the opening (6) or the entire area of the opening (6). During sharpening of a chain saw, the tooth engaging part of the ring portion (3a), which is adjacent to the opening (6), engages or is inserted into the cutting tooth of a chain saw.

A shaft or a chuck (8) represents a general concept of how the sharpening device (1) is connected to a hand-held power tool. The shaft (8) removably connects the top (21) of the cylindrical body portion (2) to the hand-held power tool. The bottom (23) of the cylindrical body portion includes the radially extending flange portion (7) and a recess (not shown in FIG. 1) which receives therein the shaft (8) of the hand-held power tool. In one embodiment, the upper portion (21), the intermediate portion (22), the ring portion (3), the bottom portion (23), and the flange portion (7) are removably connected to each other.

Figure 2:
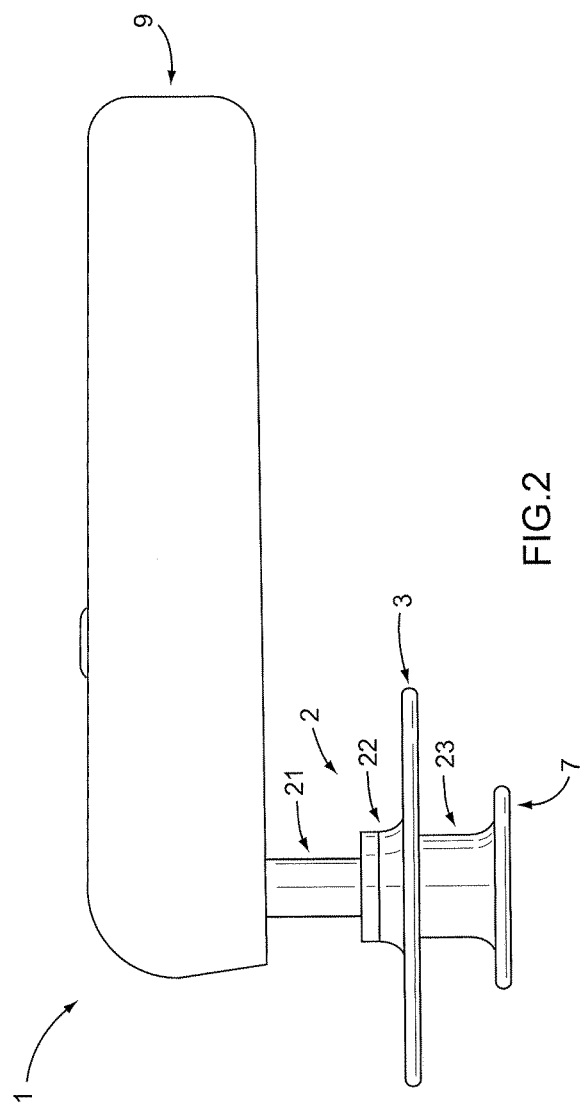
FIG. 2 is a side view of the chain saw sharpener of the present invention.

FIG. 2 shows a side view of the sharpening device (1) according to the invention. The top (21) of the cylindrical body portion (2) is connected to the hand-held power tool (9) and the bottom (23) of the cylindrical body portion is connected to the radially extending flange portion (7). During operation of the sharpener, sonic, ultrasonic or other forms of vibrations generated by the hand-held power tool (9) are transmitted to the ring portion (3) and the flange portion (7) via the cylindrical body portion (2) in order to sharpen the chain saw teeth and rakers.

Figure 3:
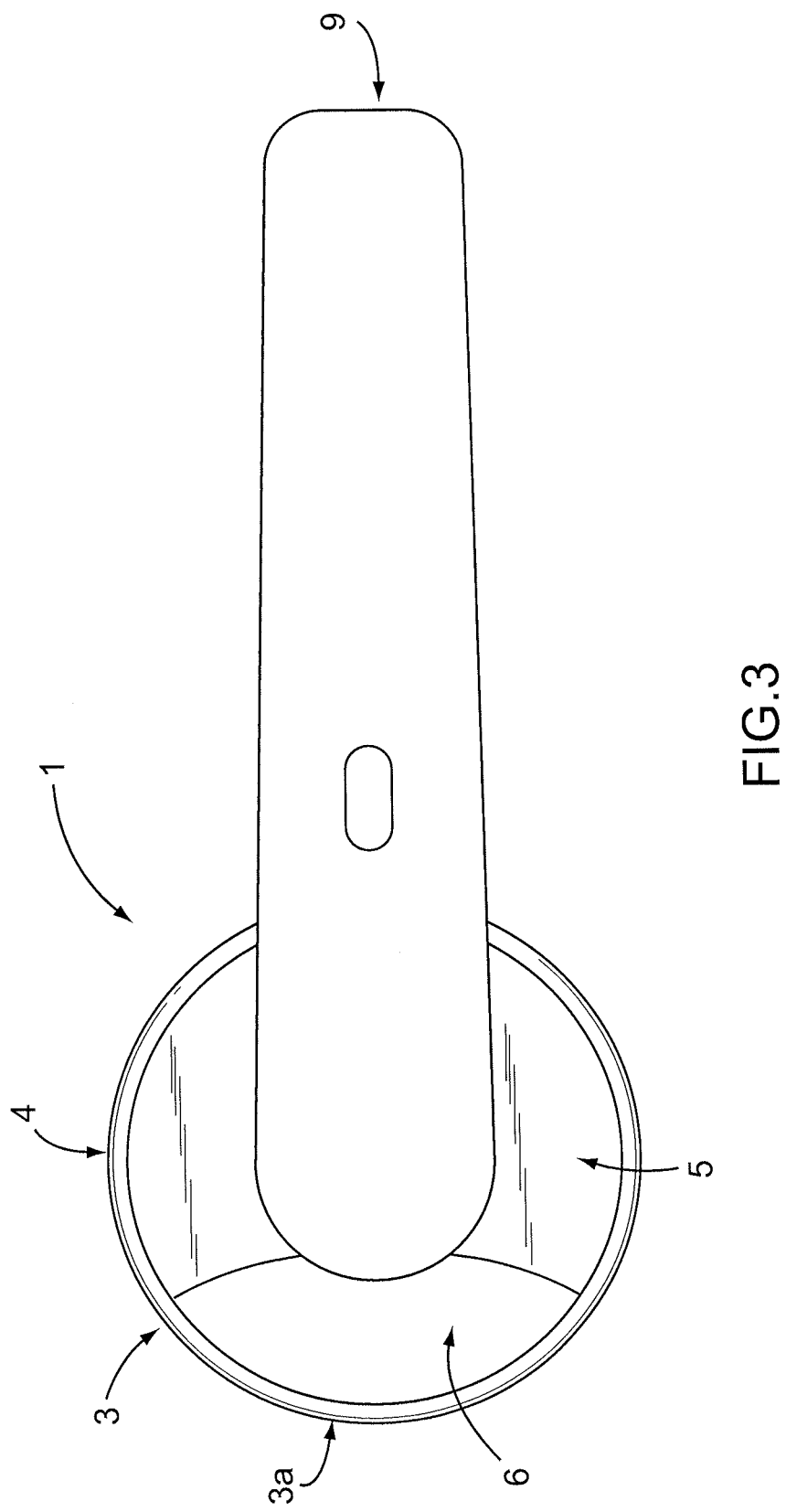
FIG. 3 is a top view of the chain saw sharpener of the present invention.

FIG. 3 shows a top view of the sharpening device (1) according to the invention. The ring portion (3) includes the circular ring (4) and the plate-like body portion (5). The plate-like body portion (5) is shown to span more than half of the area defined by the circular ring (4). However, the plate-like body portion (5) could be configured to span half or less than half of the area defined by the circular ring (4). The circular ring (4) and the plate-like body portion (5) define the aperture or opening (6) through which an operator may view a cutting tooth of a chain saw while being engaged by the sharpening device (1). It is within the scope of the invention for a part or the entire area of the opening (6) to be covered with a transparent material. During operation, the tooth engaging part of the ring portion (3a) engages or is inserted into or under a cutting tooth of a chain saw.

Figure 4:
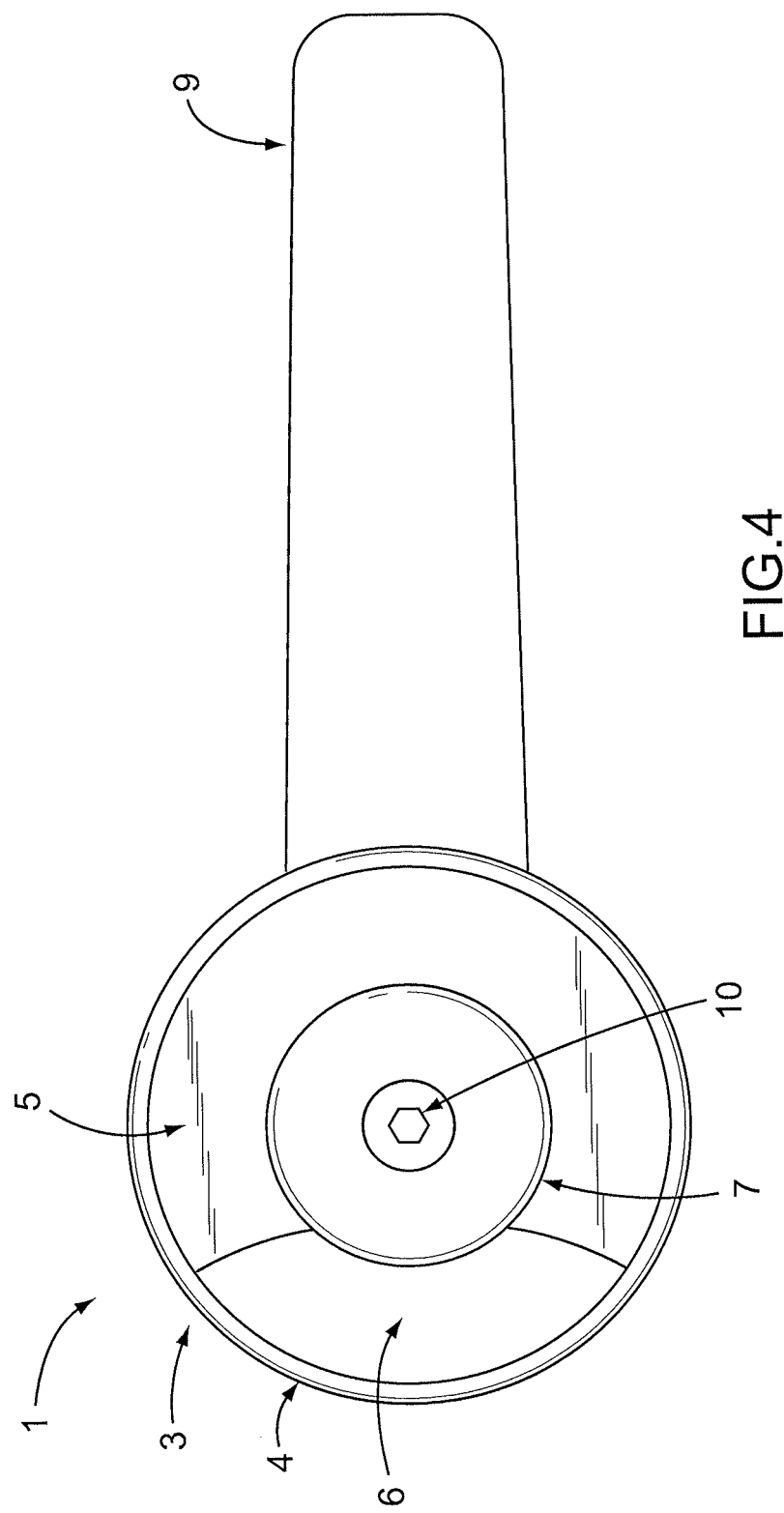
FIG. 4 is a bottom view of the chain saw sharpener of the present invention.

The bottom view of the sharpening device, as seen in FIG. 4, shows the ring portion (3), the flange portion (7) and the recess (10) that receives the shaft of the hand-held power tool. The ring portion (3) includes the circular ring (4) and the plate-like body portion (5). The circular ring (4) and the plate-like body portion (5) define the opening (6) that allows the operator to ensure a proper engagement of the sharpening device (1) with a cutting tooth of a chain saw by simply looking there through.

Figure 5:
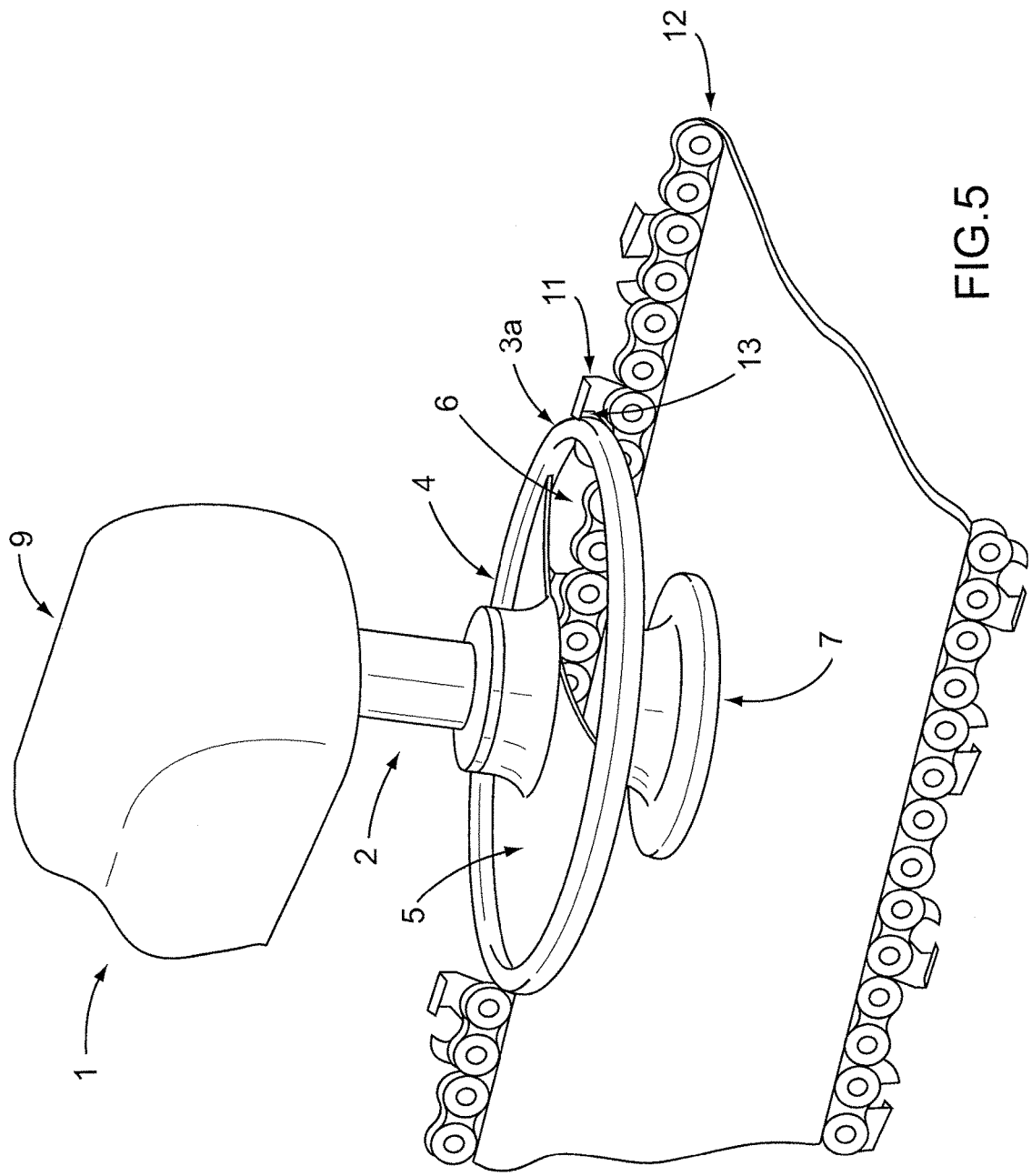
FIG. 5 is a perspective view of the chain saw sharpener of the present invention being used to sharpen the cutting tooth of a chain saw.

FIGS. 5-8 show the chain saw sharpener of the invention being used to sharpen the cutting teeth of a chain saw. As shown in FIG. 5, the tooth engaging part of the ring portion (3a), which is adjacent to the opening (6), engages or is inserted into or under a cutting tooth (11) of a saw chain (12) which is sharpened by sonic, ultrasonic or other forms of vibrations transmitted from the cylindrical body portion (2) via the hand-held power tool (9). The opening (6) allows an operator to view engagement details of the sharpener and a cutting tooth while the tooth is being sharpened by the vibrations transmitted thereto. As can be seen from FIGS. 5 and 6, the flange portion (7) of the sharpening device (1) provides a desired cutting angle (13) when the ring portion (3) engages the cutting tooth (11) of the saw chain (12). Moreover, the flange portion (7) holds the ring portion (3) in a proper position throughout the sharpening of the cutting tooth (12) so that the cutting surfaces of the tooth are sharpened to have desired cutting angles.

Figure 6:
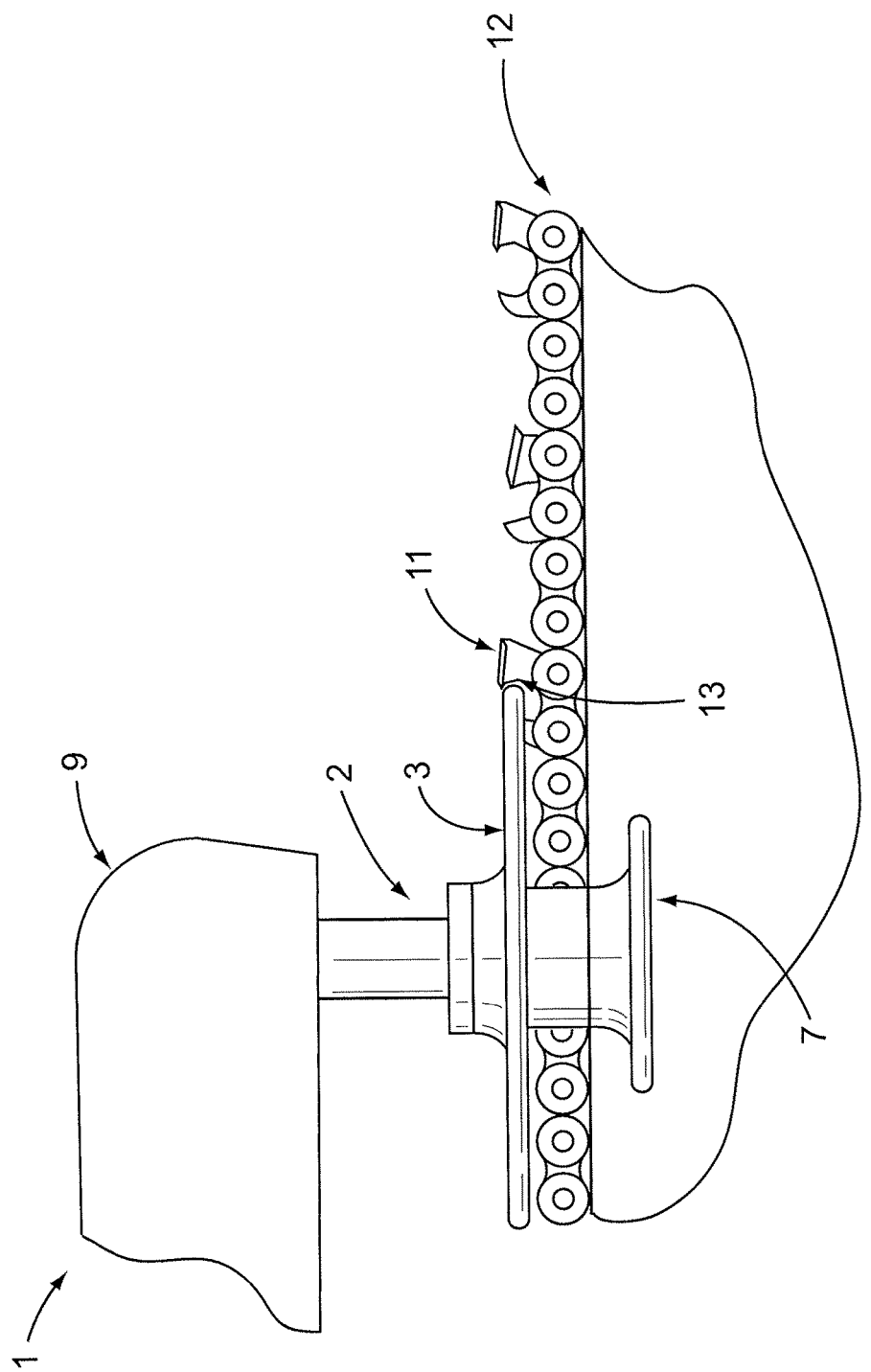
FIG. 6 is a side view of the chain saw sharpener of the present invention being used to sharpen the cutting tooth of a chain saw.

FIG. 6 is a side view of the chain saw sharpener according to the invention being used to sharpen the cutting teeth of a chain saw. As shown in FIG. 6, the ring portion (3) of the sharpening device (1) engages the cutting tooth (11) of a chain saw (12). Although it appears from FIG. 6 that, during sharpening, the sharpening device (1) may be parallel to or aligned with the chain saw (12), the sharpening device (1) may actually be at an angle with respect to the chain saw (12), as shown in FIG. 5.

It can be seen from FIGS. 5 and 6 that the sharpening device of the invention could be used to sharpen the alternating left-handed and right-handed teeth of a chain saw without changing the orientation of the chain saw or without requiring the operator to move to the other side of the saw.

Figure 7:
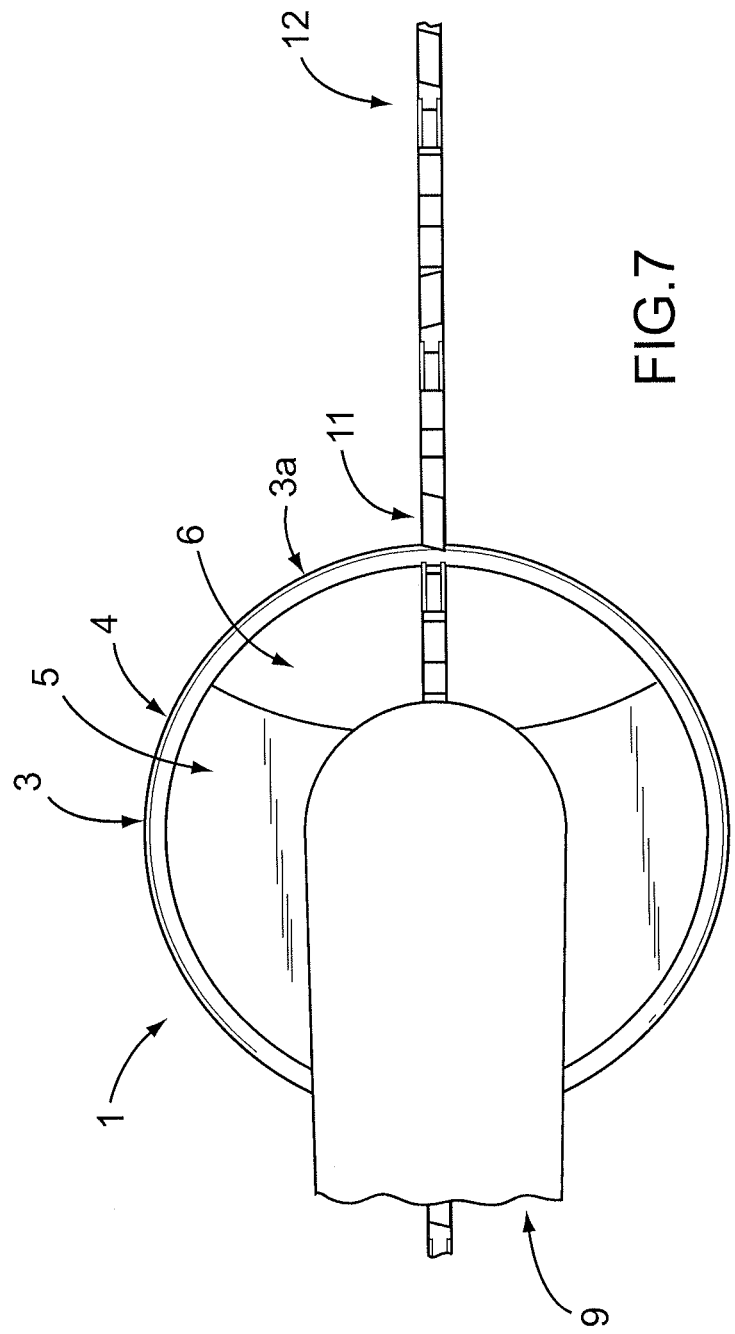
FIG. 7 is a top view of the chain saw sharpener of the present invention being used to sharpen the cutting tooth of a chain saw.
Figure 8:
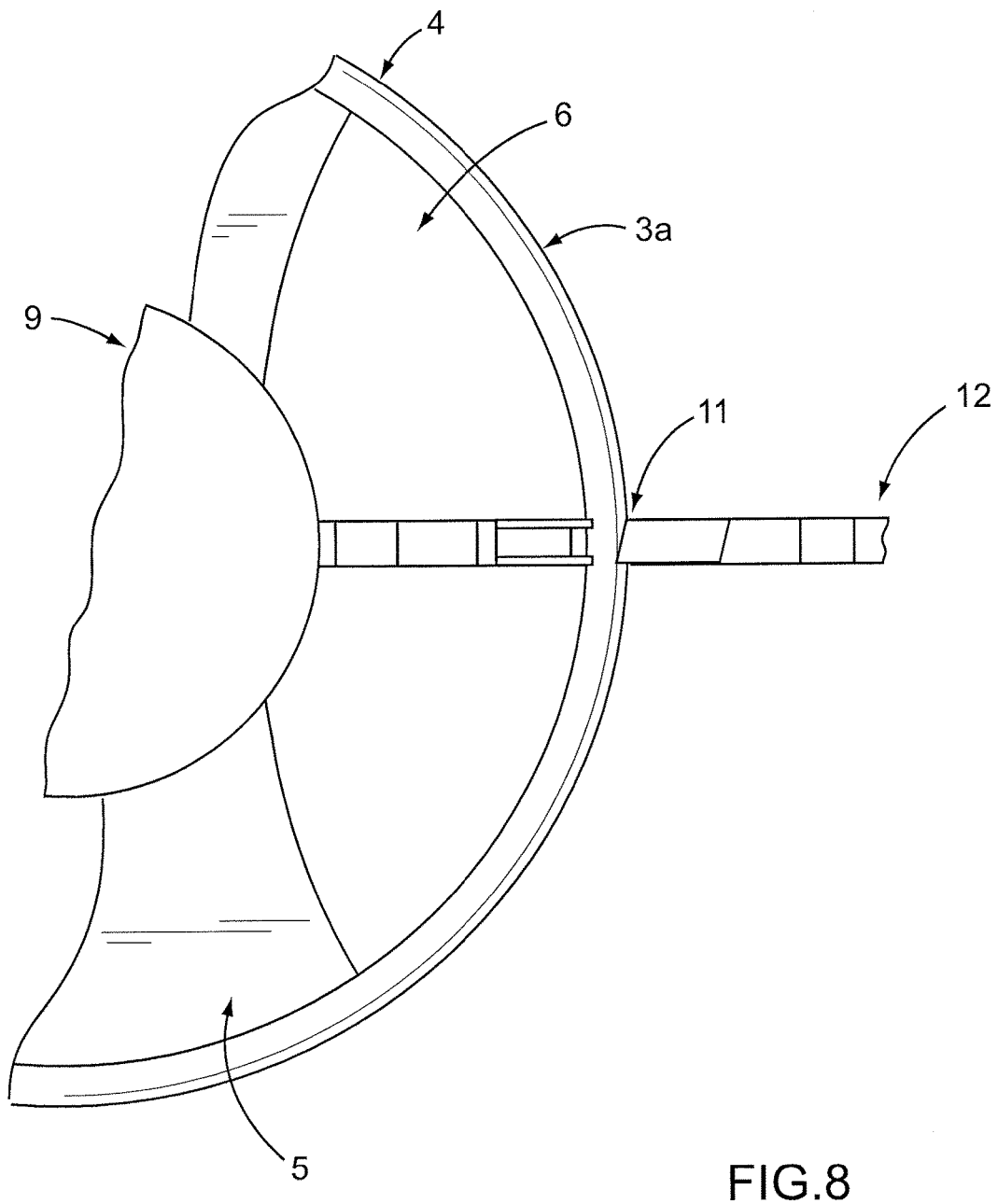
FIG. 8 is an enlarged view of FIG. 7.

FIGS. 7 and 8, respectively, show a top view and an enlarged top view of the chain saw sharpener of the invention in use. The tooth engaging part of the ring portion (3a) is engaged into or fits snugly against the cutting tooth (11) of the saw chain (12). The opening (6) allows an operator to view the engagement of the cutting tooth (11) with the sharpening device (1). The opening (6) may be covered partially or completely with a transparent material. It may appear from FIGS. 7 and 8 that the sharpening device (1) is aligned parallel to the chain saw; however, the sharpening device (1) may be at an angle with respect to the chain saw as shown in FIG. 5.

Figure 9:
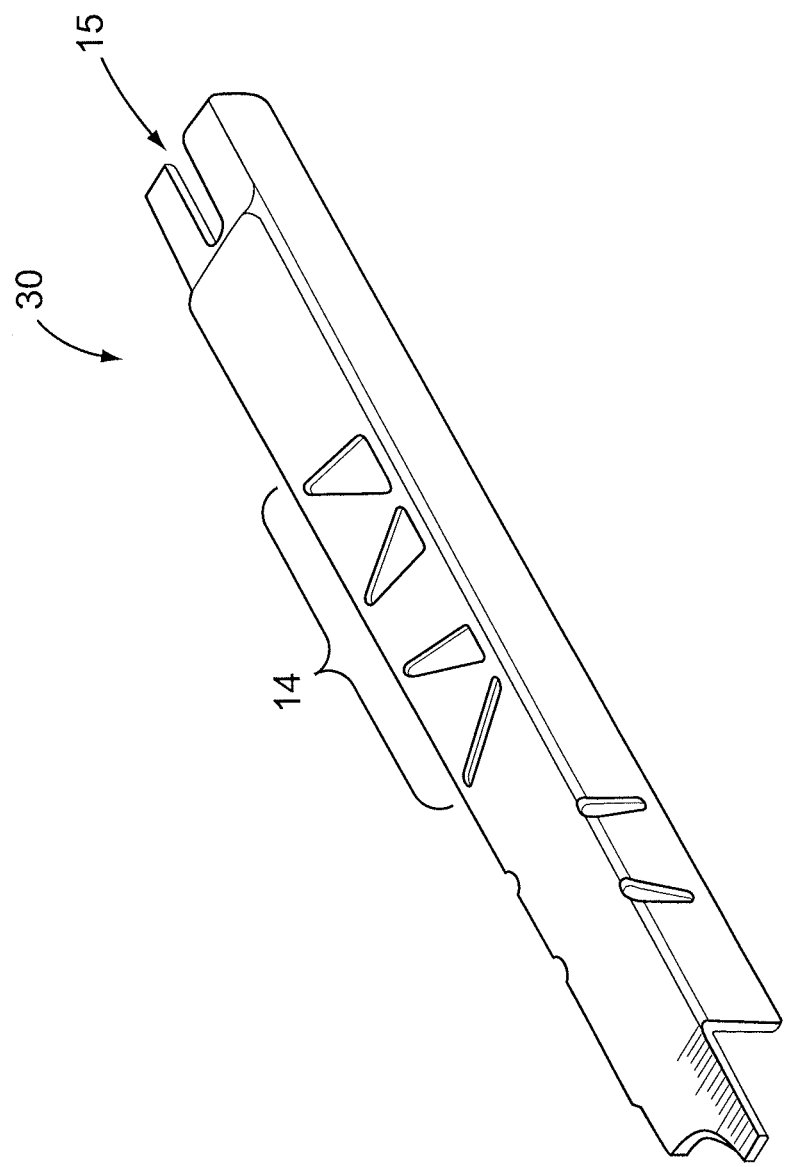
FIG. 9 is a perspective view of a raker gauge.
Figure 10:
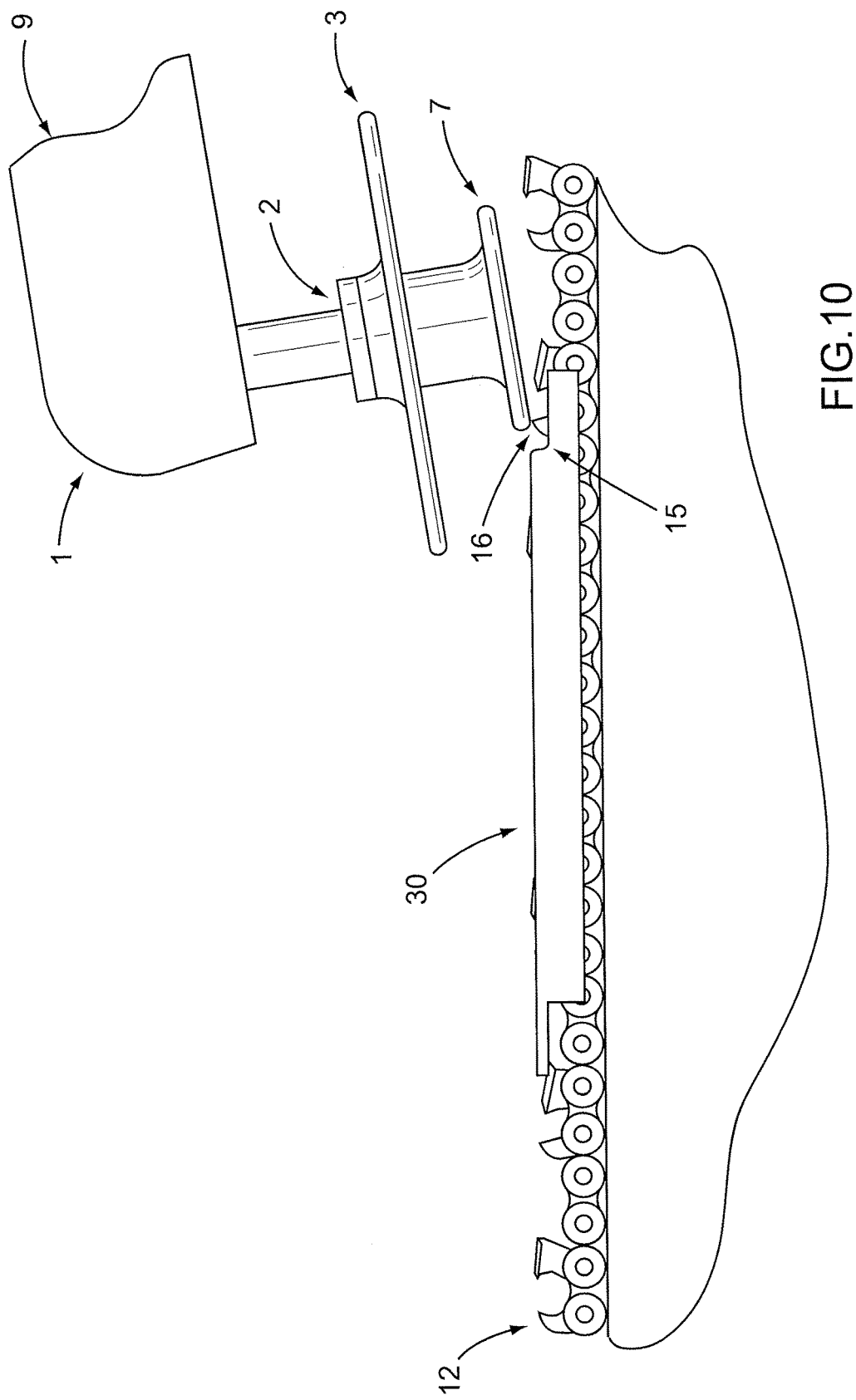
FIG. 10 shows the chain saw sharpener of the present invention being used to file a raker of a chain saw.

FIG. 9 shows a depth gauge tool or a raker gauge (30) commonly used to verify the cutting angles of chain saw teeth and the dimensions, e.g., height, of the rakers. The raker gauge (30) has various sighting edges (14) to measure the cutting angles of chain saw blades and a U-shaped cut-out (15) for checking the height of the rakers. To measure the height of the rakers, the raker gauge (30) is placed on a chain saw (12) so that the U-shaped slot (15) catches the raker (16) (FIG. 10). If the raker sticks up above the level of the raker gauge, then it needs to be filed or sharpened to adjust its height with respect to the height of the cutting tooth. To file or sharpen the rakers to a desired height, the sharpener (1) is vibrated by turning on the hand-held power tool (9), the raker gauge (30) is placed on the chain saw (12) and the flange portion (7) of the sharpener (1) is used to file the height of the raker (16) (FIG. 10).

Figure 11:
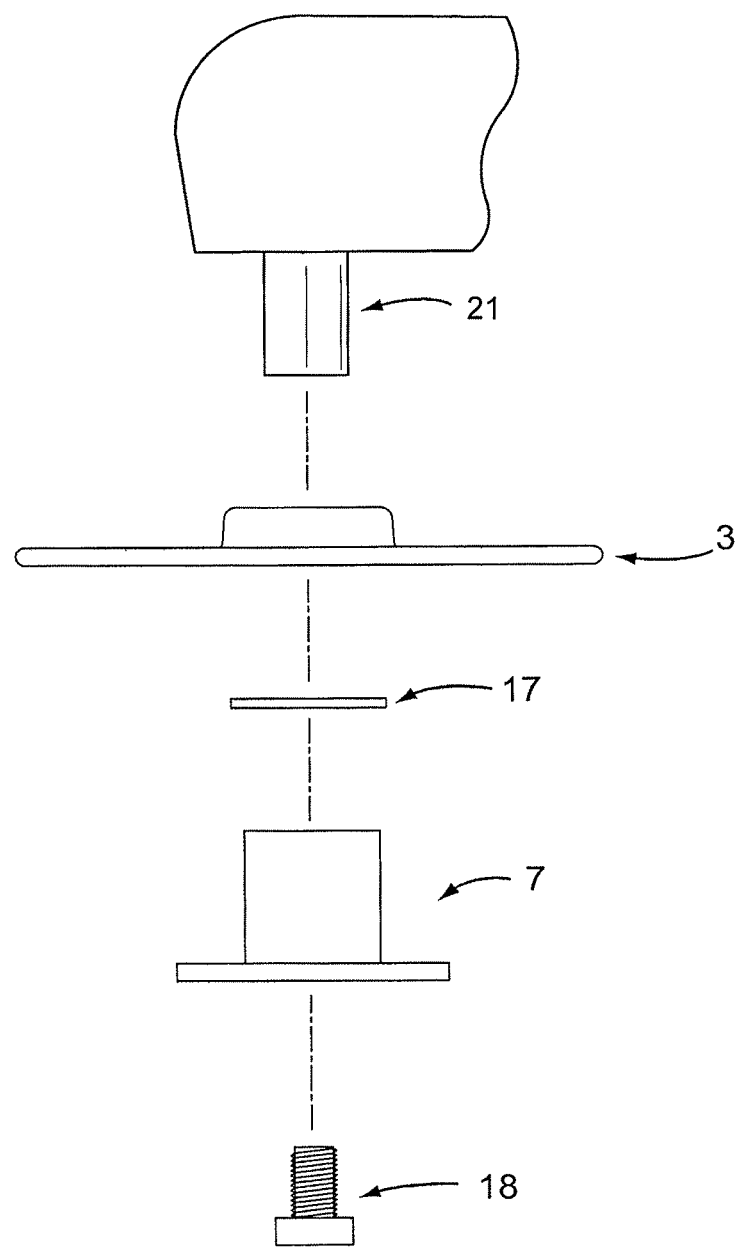
FIG. 11 shows an assembly view of an embodiment of a chain saw sharpener according to the invention wherein various parts of the sharpening device are removably connected to each other.

FIG. 11 shows an assembly view of an embodiment of a chain saw sharpener according to one aspect of the invention. In this embodiment, the intermediate portion (22), the ring portion (3), and the flange portion (7) of the sharpening device are removably connected to one another, for example, by using a washer (17) and a screw (18). It is also within the scope of the invention that the various portions of the sharpening device could be removably connected to each other by any other means known in the art.

Figure 12:
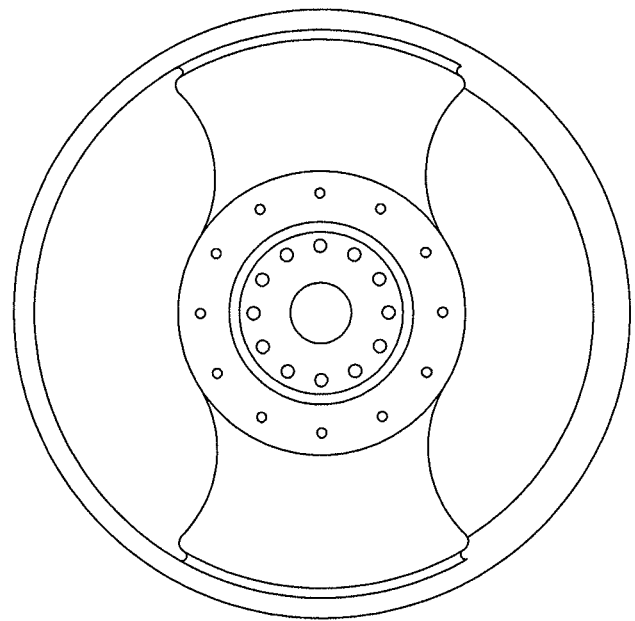
FIG. 12 shows a top view of the ring portion of a chain saw sharpener according to one embodiment.

FIG. 12 shows a top view of the ring portion of a chain saw sharpener according to one embodiment. In this embodiment, the cross-sectional diameter of a portion of the circular ring is different from the cross-sectional diameter of another portion of the circular ring.

Figure 13:
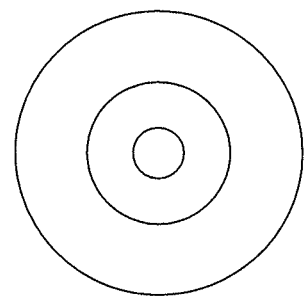
FIG. 13 shows a top view of the flange portion of a chain saw sharpener according to one embodiment.

FIG. 13 shows a top view of the flange portion according to one embodiment. According to one aspect of the invention, a screw could be passed through the circular hole at the center of the flange portion in order to removably connect the flange portion to the ring portion via a washer.

Although the present invention has been described with reference to a preferred embodiment, it is to be understood that the invention is not limited to the details thereof. A number of possible modifications and substitutions will occur to those of ordinary skill in the art, and all such modifications and substitutions are intended to fall with the scope of the invention as defined in the appended claims.

I claim:

1. A chain saw sharpener for sharpening a saw chain, the sharpener comprising:
    a cylindrical body portion extending along a longitudinal axis, the cylindrical body portion including an upper portion, an intermediate portion, and a bottom portion, wherein the upper portion, the intermediate portion, and the bottom portion are removably connected to each other;
    a ring portion connected to a plate body, wherein at least part of a surface of the ring portion is abrasive to sharpen at least a first portion of the saw chain, the ring portion being connected to the intermediate portion via the plate, wherein the ring portion has an outer radius and an inner radius about a ring portion axis approximately aligned with the longitudinal axis, and has a thickness greater than the plate body;
    at least one opening in the plate body, wherein at least a portion of the at least one opening has approximately the same radius of curvature as the inner radius of the ring portion;
    the bottom portion of the cylindrical body portion extending beyond the intermediate portion, the bottom portion having a second radius about a bottom portion axis approximately aligned with the longitudinal axis;
    a flange portion integrally connected to the bottom portion and configured to sharpen at least a second portion of the saw chain, the flange portion extending radially from the second radius of the bottom portion and having a third radius about a flange portion axis approximately aligned with the longitudinal axis, wherein the third radius is greater than the second radius and less than the outer radius of the ring portion, and wherein the bottom portion is located at least partially between the flange portion and the ring portion; and
    a hand-held power tool removably connected to the upper portion of the cylindrical body portion.

2. The chain saw sharpener according to claim 1, wherein the plate body portion spans half, more than half, or less than half of an area defined by the circular ring.

3. The chain saw sharpener according to claim 1, wherein the flange portion is configured to position the ring portion at a desired cutting angle relative to the cylindrical body portion when the chain saw sharpener engages a cutting tooth of the saw chain.

4. The chain saw sharpener according to claim 1, wherein the ring portion is configured to sharpen a cutting tooth of the saw chain.

5. The chain saw sharpener according to claim 1, wherein the flange portion is coated with an abrasive material.

6. The chain saw sharpener according to claim 1, wherein at least one of the ring portion or the flange portion extends orthogonally relative to a longitudinal axis of the cylindrical body portion.

7. The chain saw sharpener according to claim 1, wherein at least one of the ring portion or the flange portion extends obliquely relative to a longitudinal axis of the cylindrical body portion.

8. A saw chain sharpener, comprising:
    a cylindrical body portion having a radius and extending along a longitudinal axis from a first end to a second end, the cylindrical body portion including a tool receiving portion at the first end, an intermediate portion proximal to the second end, and a bottom portion at the second end;
    a hand-held power tool removably connectable to the tool receiving portion;
    a ring portion connected to a plate body, wherein at least part of a surface of the ring portion is abrasive to sharpen at least a first portion of a saw chain, the ring portion circumferentially surrounding and being connected to at least the intermediate portion of the cylindrical body through the plate body, wherein the ring portion has an outer radius and an inner radius about a ring portion axis approximately aligned with the longitudinal axis, and has a thickness greater than the plate body; wherein the outer radius of the ring portion being is greater than the cylindrical portion radius;
    at least one opening in the plate body, wherein at least a portion of the at least one opening has approximately the same radius of curvature as the inner radius of the ring portion, wherein the bottom portion is coupled to the intermediate body portion opposite the first end of the cylindrical body portion; and
    a flange portion configured to sharpen at least a second portion of the saw chain, the flange portion being coupled to the bottom portion so as to sandwich the bottom portion between the flange portion and the ring portion, the flange portion having a radius, wherein the flange portion radius is greater than the bottom portion radius and less than the ring portion radius, and
    wherein the tool receiving portion, the intermediate portion, and the bottom portion are removably connected to each other.

9. The chain saw sharpener according to claim 1, wherein the flange portion is configured to sharpen a raker of the saw chain.

10. A saw chain sharpener, comprising:
    a cylindrical body extending along a longitudinal axis from a first end to a second end, having a tool receiving portion at the first end and a flange portion at the second end;
    an intermediate portion coaxial with and connected to the tool receiving portion;
    a ring portion, having an inner radius, an outer radius, and a first thickness, the ring portion being connected to a plate body and having a second thickness, wherein the first thickness differs from the second thickness and the ring portion circumferentially surrounds and is connected to the intermediate portion of the cylindrical body via the plate body and the ring portion, wherein at least part of a surface of the ring portion is abrasive;

at least one opening in the plate body, wherein at least a portion of the at least one opening has approximately the same radius of curvature as the inner radius of the ring portion;

a bottom portion, having a radius, the bottom portion being located between the flange portion and the ring portion; and the flange portion being connected with the bottom portion and having a radius, wherein the radius of the flange portion is greater than the radius of the bottom portion and less than the radius of the ring portion.

11. The saw chain sharpener of claim 8, wherein the tool receiving portion, the intermediate portion, and the bottom portion are removably connected to each other.

12. The chain saw sharpener according to claim 1, wherein the plate body portion has a surface area proximal to the circular ring that has an area size that is greater than half of an area size encompassed by an outer circumferential edge of the circular ring.

13. The chain saw sharpener according to 1, wherein the plate body portion has an outer edge lying in a plane normal to a direction of thickness of the plate body portion, and wherein a surface area bounded by the outer edge of the plate body portion has an area size less than half of an area size encompassed by an outer circumferential edge of the circular ring.

14. The chain saw sharpener according to claim 1, wherein at least a portion of the ring portion or the flange portion is knurled.

15. The chain saw sharpener according to claim 8, wherein at least a portion of the ring portion or the flange portion is coated with an abrasive material.

16. The chain saw sharpener according to claim 8, wherein at least a portion of the ring portion or the flange portion is knurled.

17. The chain saw sharpener according to claim 10, wherein at least a portion of the ring portion or the flange portion is coated with an abrasive material.

18. The chain saw sharpener according to claim 10, wherein at least a portion of the ring portion or the flange portion is knurled.

* * * * *